United States Patent [19]
Chen

[11] Patent Number: 6,086,235
[45] Date of Patent: Jul. 11, 2000

[54] LIGHT SPOT GENERATING ORNAMENTS

[76] Inventor: Lily Chen, 1F, No. 4, Alley 8, Lane 265, Lian-Cherng Rd., Jong-Her City, Taipei Shine, Taiwan

[21] Appl. No.: 09/150,510

[22] Filed: Sep. 9, 1998

[30] Foreign Application Priority Data

Oct. 24, 1997 [TW] Taiwan ................................ 86218067

[51] Int. Cl.[7] .................................................. F21V 8/00
[52] U.S. Cl. ........................ 362/565; 362/559; 362/311; 362/806; 40/547
[58] Field of Search .................................... 362/551, 559, 362/560, 565–568, 556, 278, 320, 351, 806, 311; 385/901; 40/547

[56] References Cited

U.S. PATENT DOCUMENTS

| | | | |
|---|---|---|---|
| 3,497,981 | 3/1970 | Tyne | 362/559 |
| 4,234,907 | 11/1980 | Daniel | 362/556 |
| 4,389,698 | 6/1983 | Cibie | 362/551 |
| 4,510,555 | 4/1985 | Mori | 362/565 |
| 4,559,583 | 12/1985 | Ku | 362/565 |
| 4,765,701 | 8/1988 | Cheslak | 32/560 |
| 4,907,132 | 3/1990 | Parker | 362/556 |
| 4,975,809 | 12/1990 | Ku | 362/565 |

*Primary Examiner*—Alan Cariaso
*Attorney, Agent, or Firm*—Pro-Techtor International

[57] ABSTRACT

A light spot generating ornament includes at least one light penetrable cord member, and light source means respectively disposed adjacent to the at least one light penetrable cord member at one end, each cord member having a plurality of refracting portions disposed at an angle relative to its longitudinal central axis, the refracting portions refracting light from the light source means, causing a plurality of light spots to be produced at each cord member at different locations.

3 Claims, 12 Drawing Sheets

LIGHT SPOT GENERATING ORNAMENTS

BACKGROUND OF THE INVENTION

The present invention relates to a light spot generating ornament which emits light axially through a light penetrable cord member, causing a plurality of light spots to be produced at the light penetrable cord member at different locations.

Regular Christmas tree light sets and decorative light strings are commonly comprised of a plurality of bulbs connected in series or parallel by conductors. When electrically connected, the bulbs are driven to flash subject to a predetermined order. Because these Christmas tree light sets and decorative light strings use a big number of bulbs, they are commonly expensive, and they consume much electricity when operated. Further, because these Christmas tree light sets and decorative light strings are generally used outdoors, the bulbs and the electric circuits tend to be damaged.

SUMMARY OF THE INVENTION

The present invention has been accomplished to provide a light spot generating ornament which eliminates the aforesaid problems. It is one object of the present invention to provide a light spot generating ornament which is inexpensive to manufacture. It is another object of the present invention to provide a light spot generating ornament which consumes less electricity. It is still another object of the present invention to provide a light spot generating ornament which is durable in use. To achieve these and other objects of the present invention, a light spot generating ornament is provided comprised of at least one light penetrable cord member, and light source means respectively disposed adjacent to the at least one light penetrable cord member at one end, each cord member having a plurality of refracting portions disposed at an angle relative to its longitudinal central axis, the refracting portions refracting light from the light source means, causing a plurality of light spots to be produced at each cord member at different locations. The refracting portions can be peripheral cut made at the periphery of each cord member, U-turns formed of a part of the cord member.

DETAILED DESCRIPTION OF THE PREFERRED EMBODIMENTS

Figure 1:
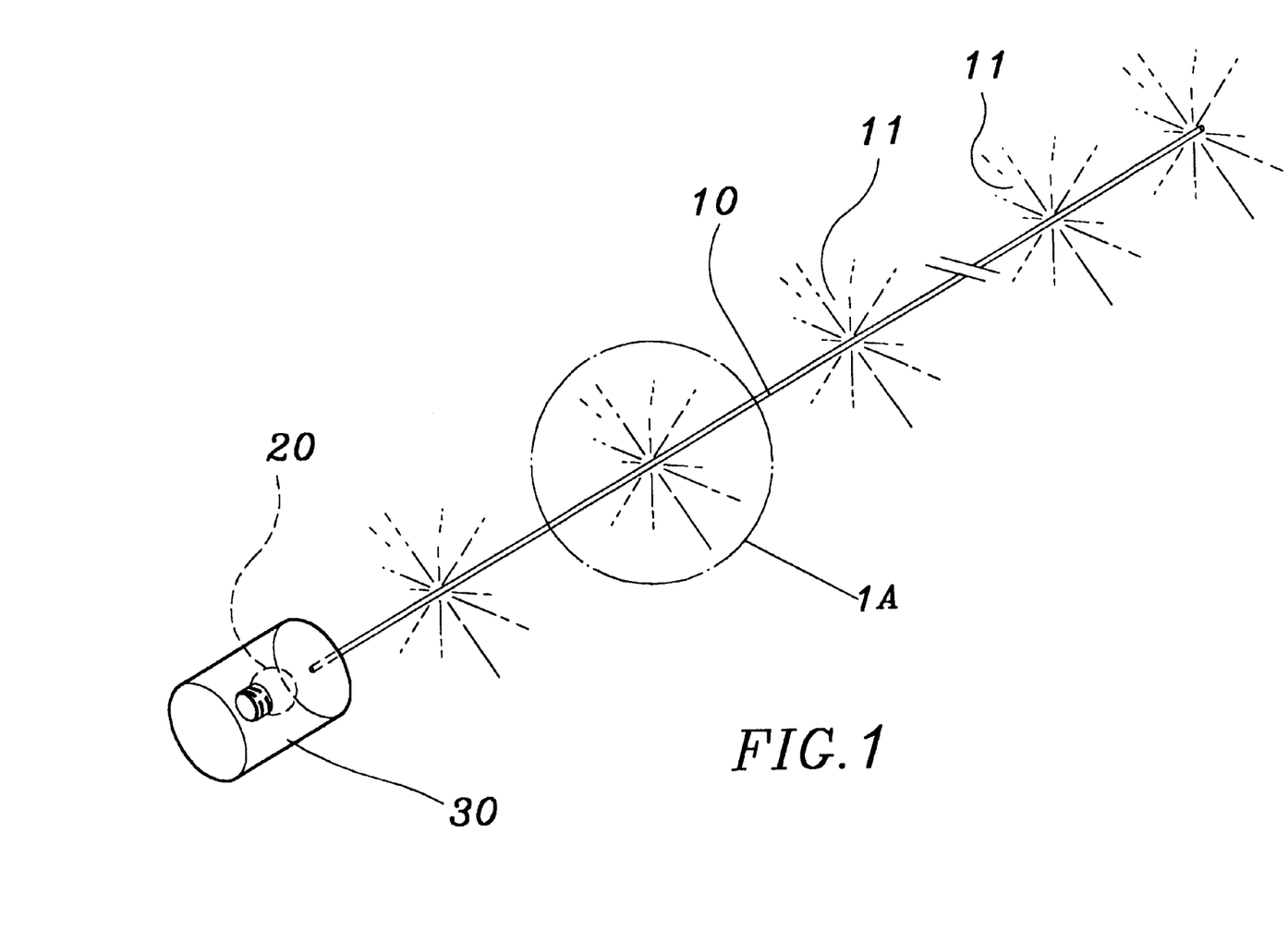
FIG. 1 is a perspective view of a first embodiment of the present invention, showing a lamp bulb encased in a shell connected to one end of a light penetrable cord member.

Referring to FIG. 1, a light spot generating ornament comprises a cord member 10 that admits light. The cord member 10 is preferably made of optical glass fibers. Alternatively, the cord member 10 can be made of transparent acrylic resin. A light source for example a lamp bulb 20 is provided at one end of the cord member 10. The lamp bulb 20 is encased in a shell 30, which guides the light the lamp bulb 20 to the cord member 10.

Figure 1A:
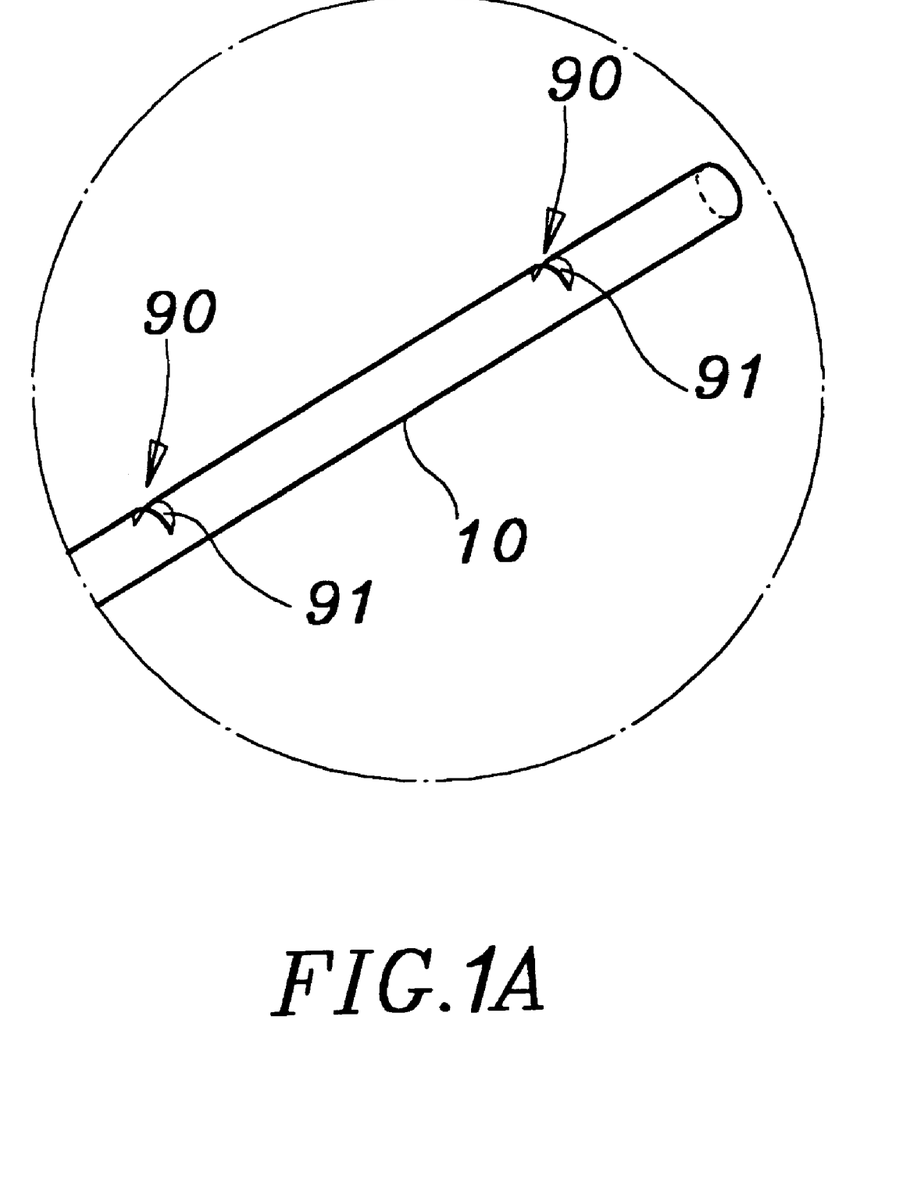
FIG. 1A is an enlarged view of a part of FIG. 1.

Referring to FIG. 1A and FIG. 1 again, the cord member 10 has a plurality of refracting portions 90, that produce a plurality of light spots 11. The refracting portions 90 can be peripheral cuts 91 made at the cord member 10 at different locations. The cuts 91 intersect with the longitudinal center axis of the cord member 10.

Figure 2:
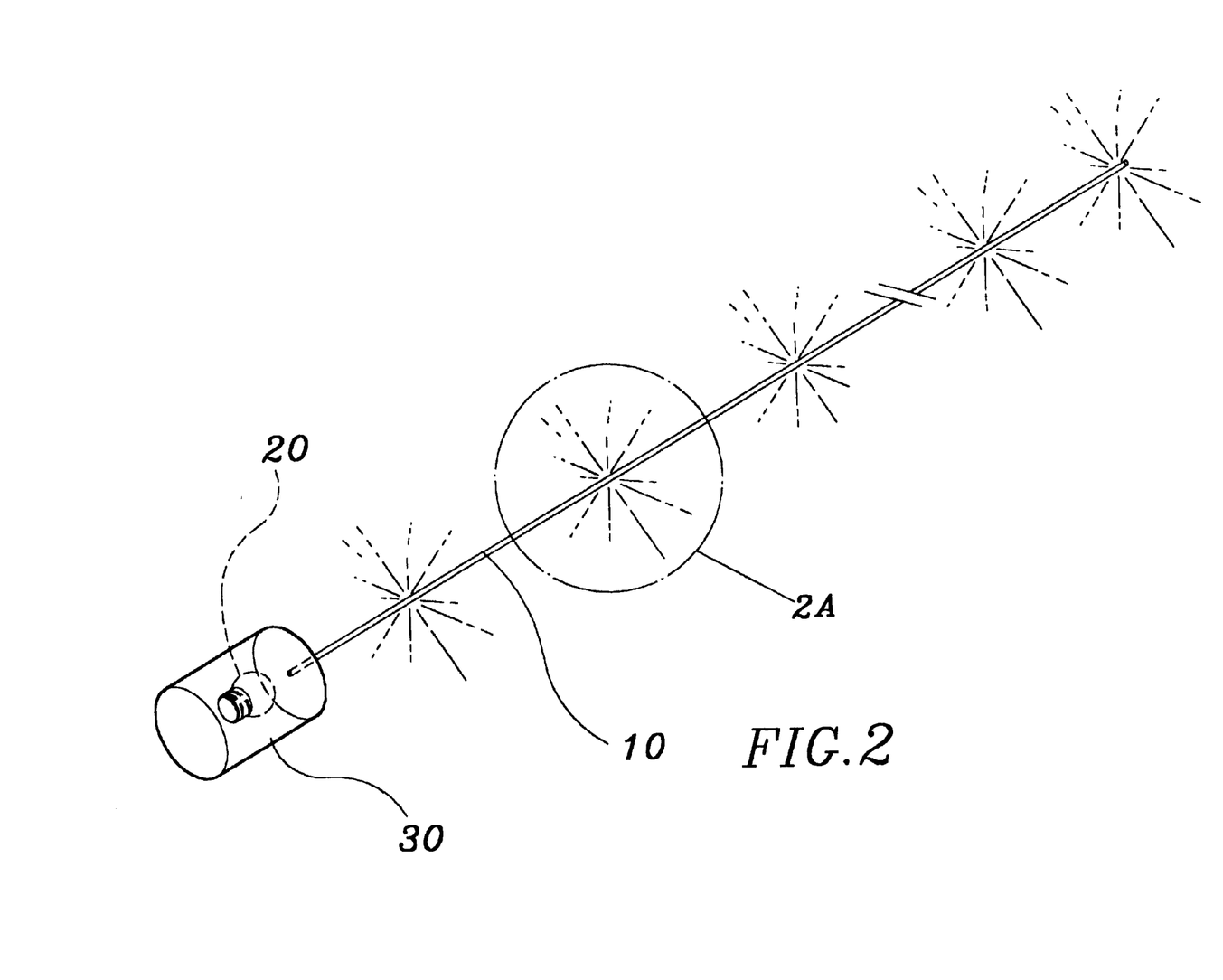
FIG. 2 is a perspective view of an alternate form of the present invention, showing a transparent shade fastened to the cord member around each peripheral cut.
Figure 2A:
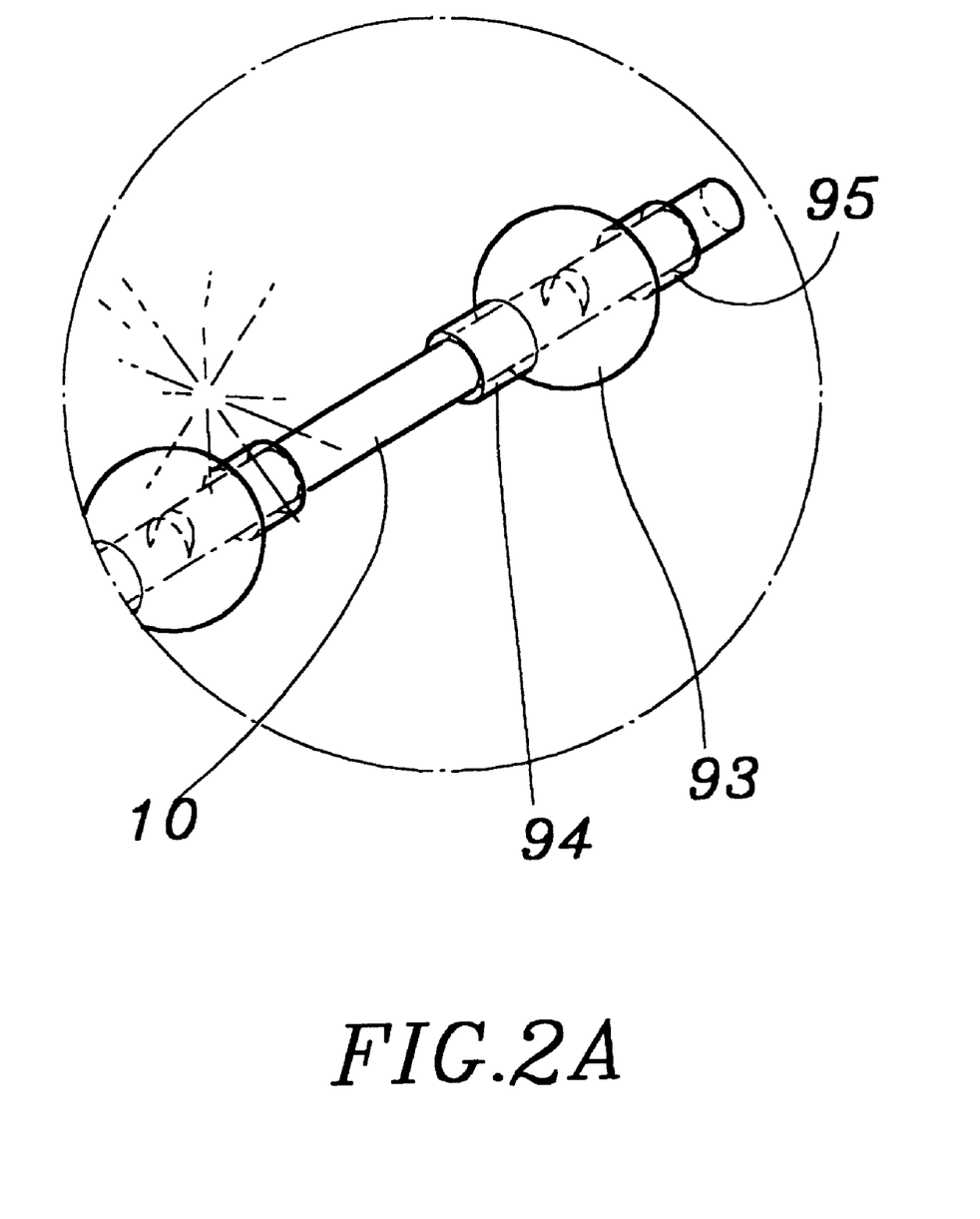
FIG. 2A is an enlarged view of a part of FIG. 2.

Referring to FIGS. 2 and 2A, transparent shades 93 are respectively mounted on the cord member 10 around the cuts 91, and firmly secured in place by binding rings 94,95.

Figure 3:
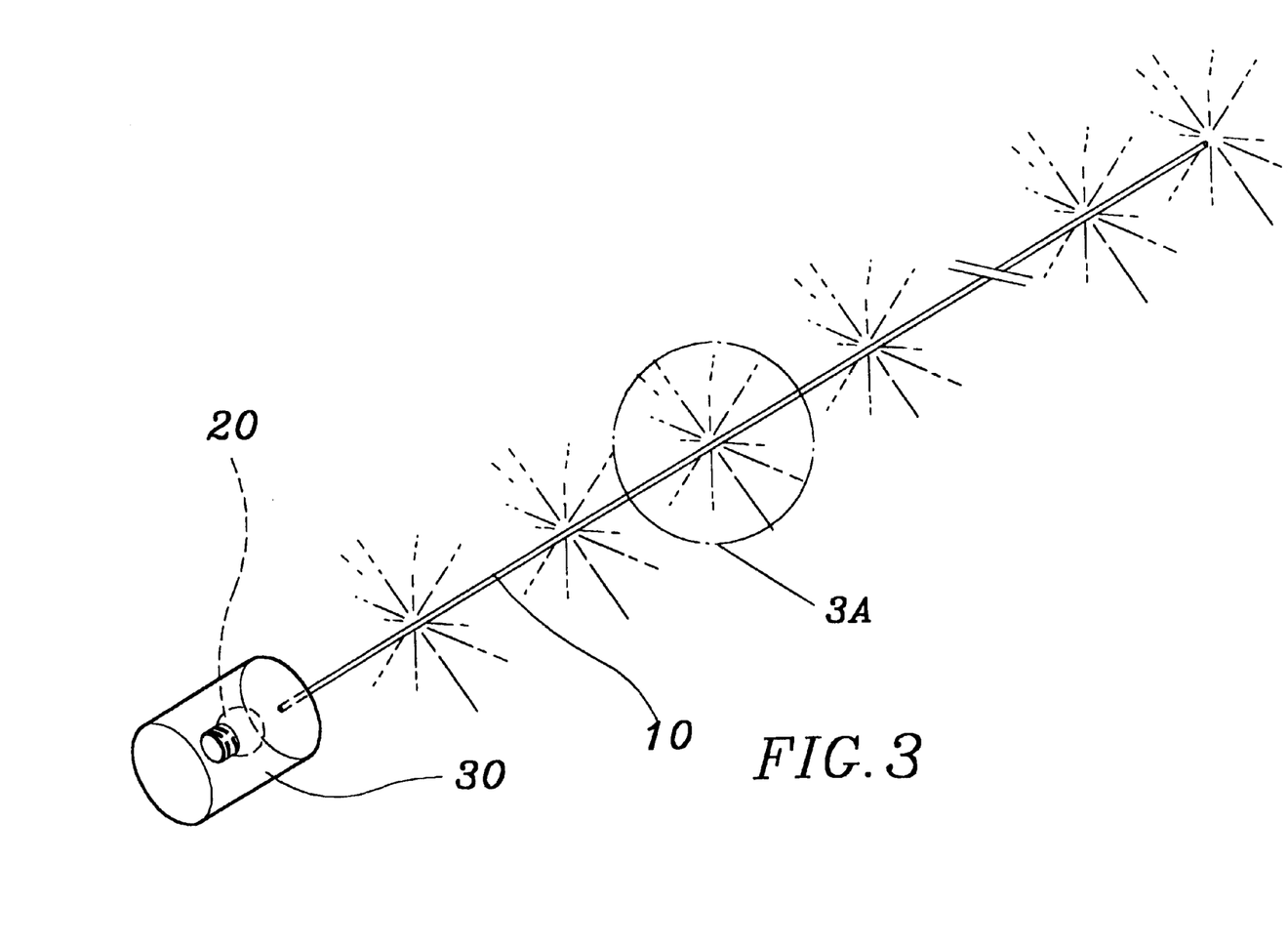
FIG. 3 is a perspective view of another alternate form of the present invention.
Figure 3A:
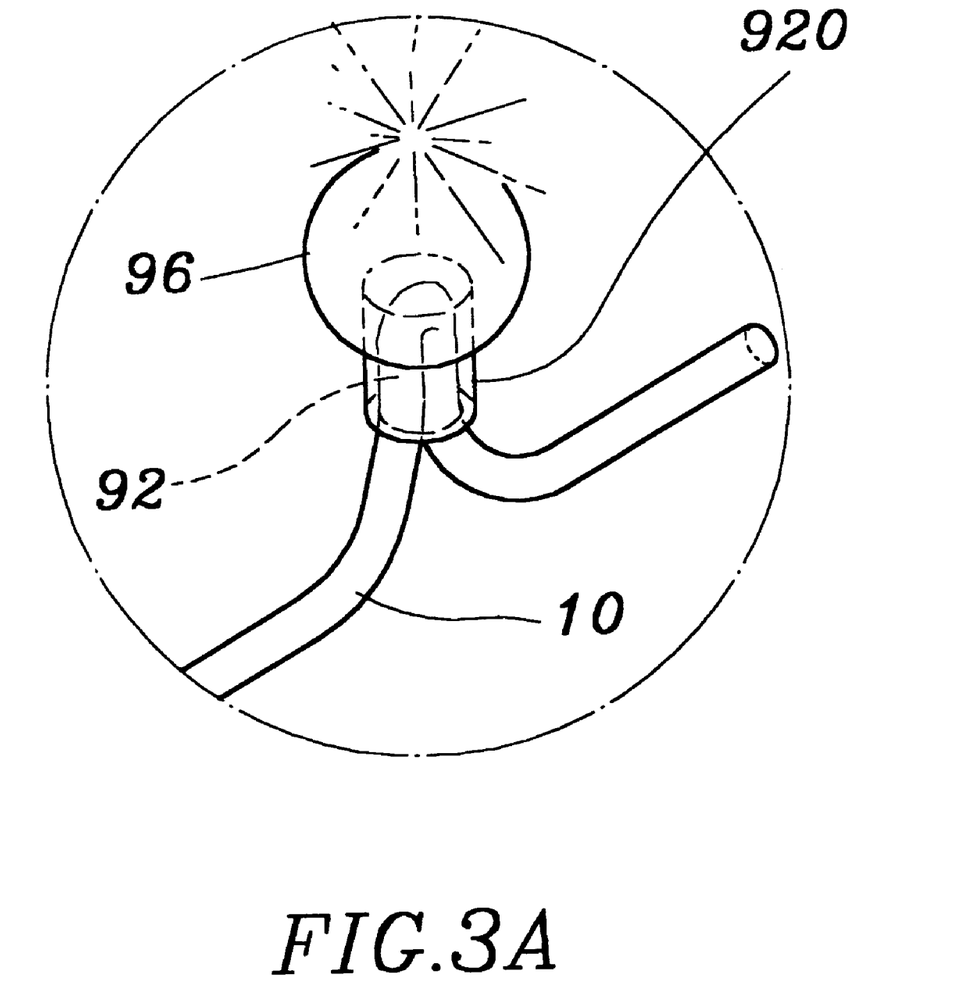
FIG. 3A is an enlarged view of a part of FIG. 3, showing a locating means fastened to one U-turn and a transparent shade mounted on the locating means.

Referring to FIGS. 3 and 3A, the refracting portions, as an alternate form of the present invention, are formed by bending the cord member 10 into a plurality of U-turns 92, and locating means 920 are fastened to the cord member 10 to hold the U-turns 92 in shape. Further, a transparent decorative item for example a transparent shade 96 may be fastened to each locating means 920 covered on each U-turn 92.

Figure 4:
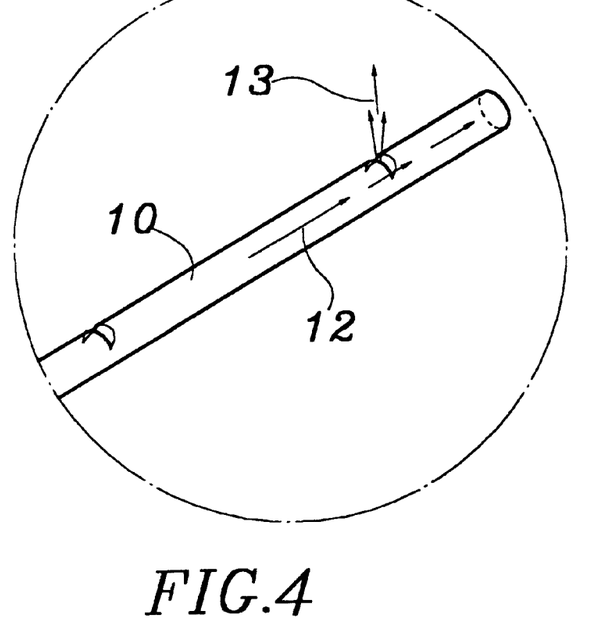
FIG. 4 is an enlarged view of a part of the cord member shown in FIG. 1, showing the moving direction of light through the cord member.
Figure 5:
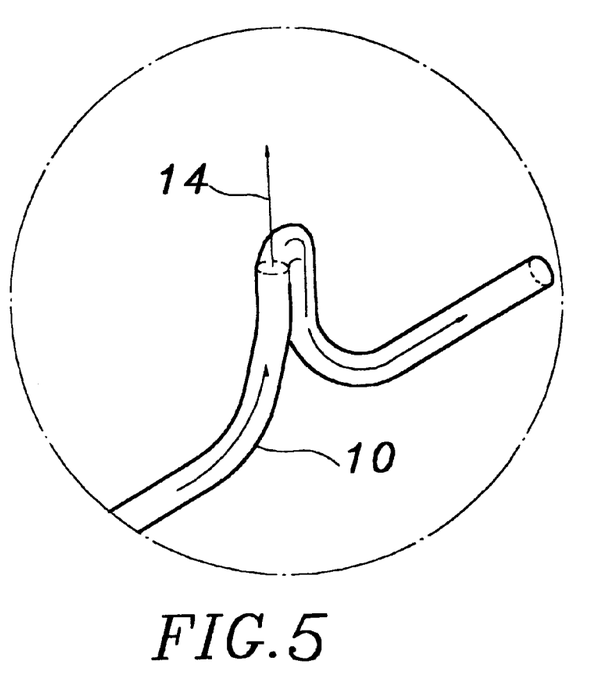
FIG. 5 is an enlarged view of a part of the cord member shown in FIG. 3, showing the moving direction of light through the cord member.

Referring to FIGS. 4 and 5, when light 12 pass axially through the cord member 10 to the refracting portions, namely, the cuts 90 shown in FIG. 1A or the U-turns 92 shown in FIG. 3A, it is refracted by the cuts 90 or the U-turns 92, and therefore refracted light spots 13 or 14 are produced at the cord member 10 at different locations.

Figure 6:
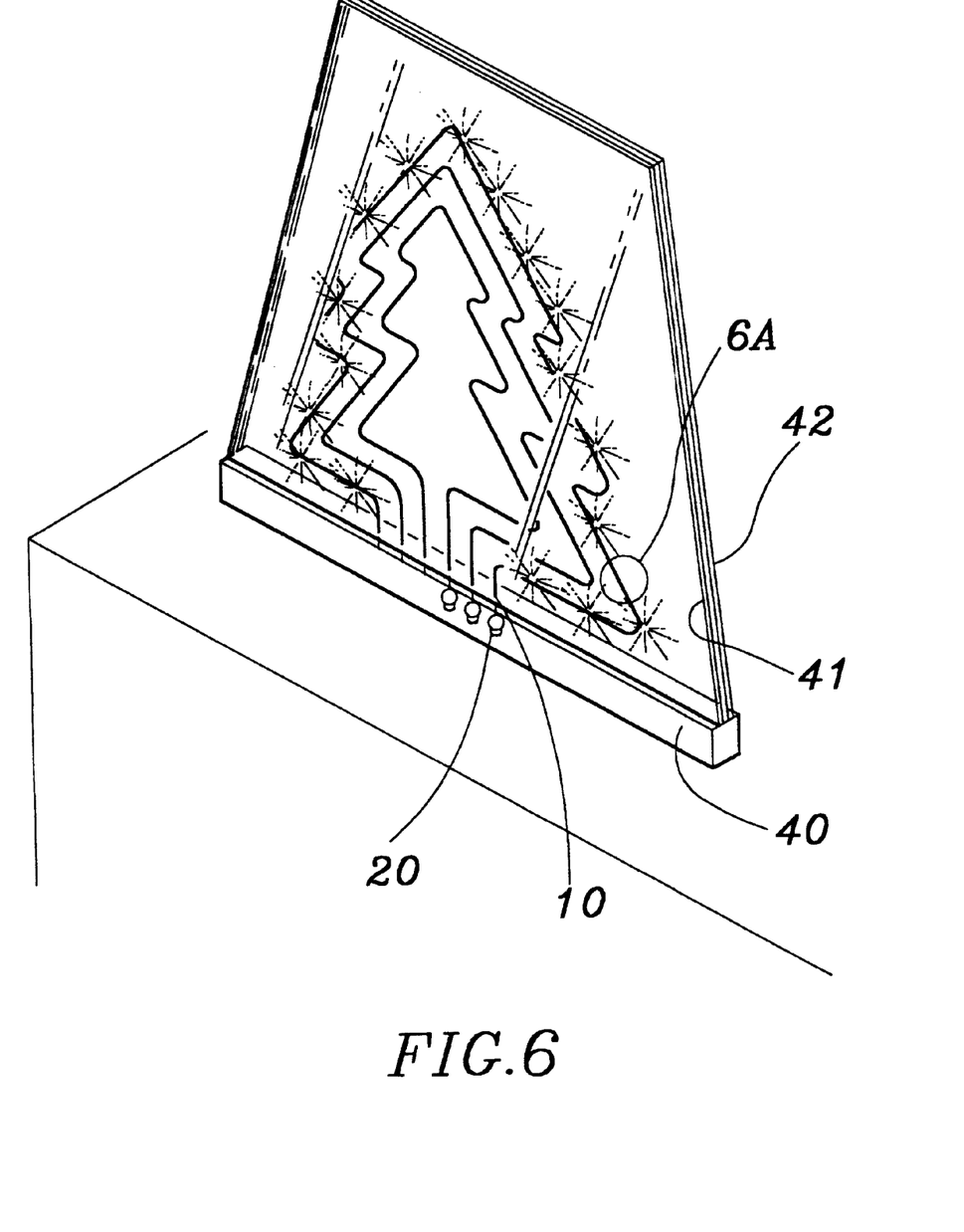
FIG. 6 is a perspective view of still another alternate form of the present invention, showing light source means mounted in a casing, cord members retained between two transparent plates.
Figure 6A:
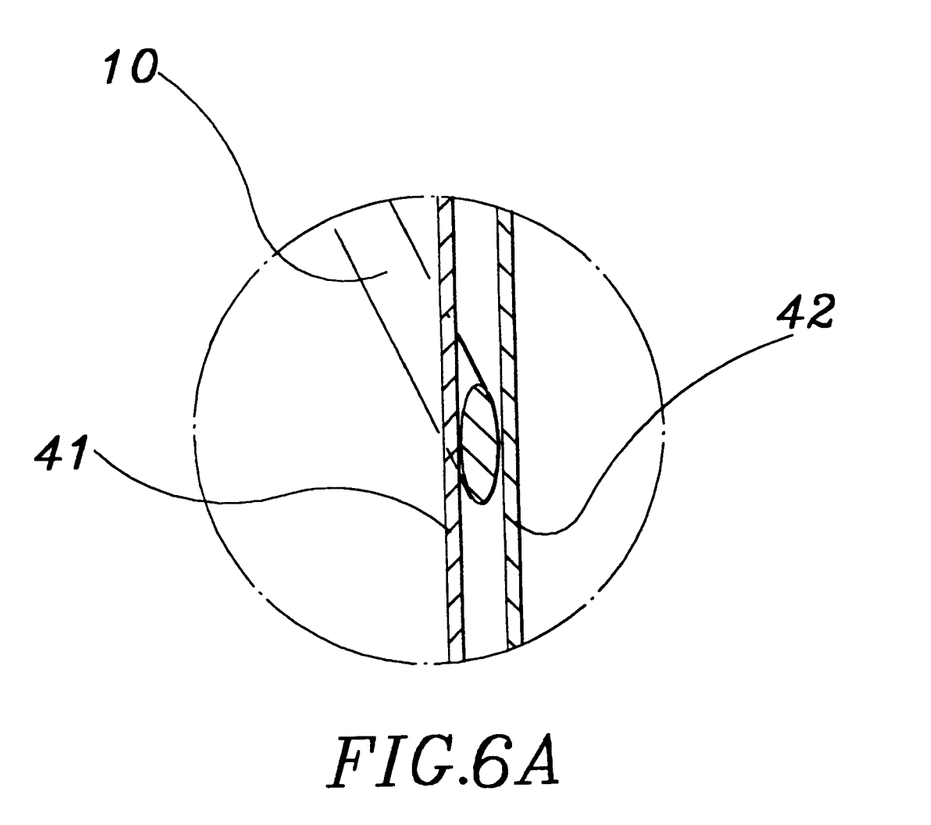
FIG. 6A is an enlarged view of a part of FIG. 6.

Referring to FIGS. 6 and 6A, a plurality of light source means 20 are respectively mounted in a casing 40, and cord members 10 which are respectively aimed at the light source means 20 are retained between two transparent plates 41,42 and arranged to show a particular design.

Figure 7:
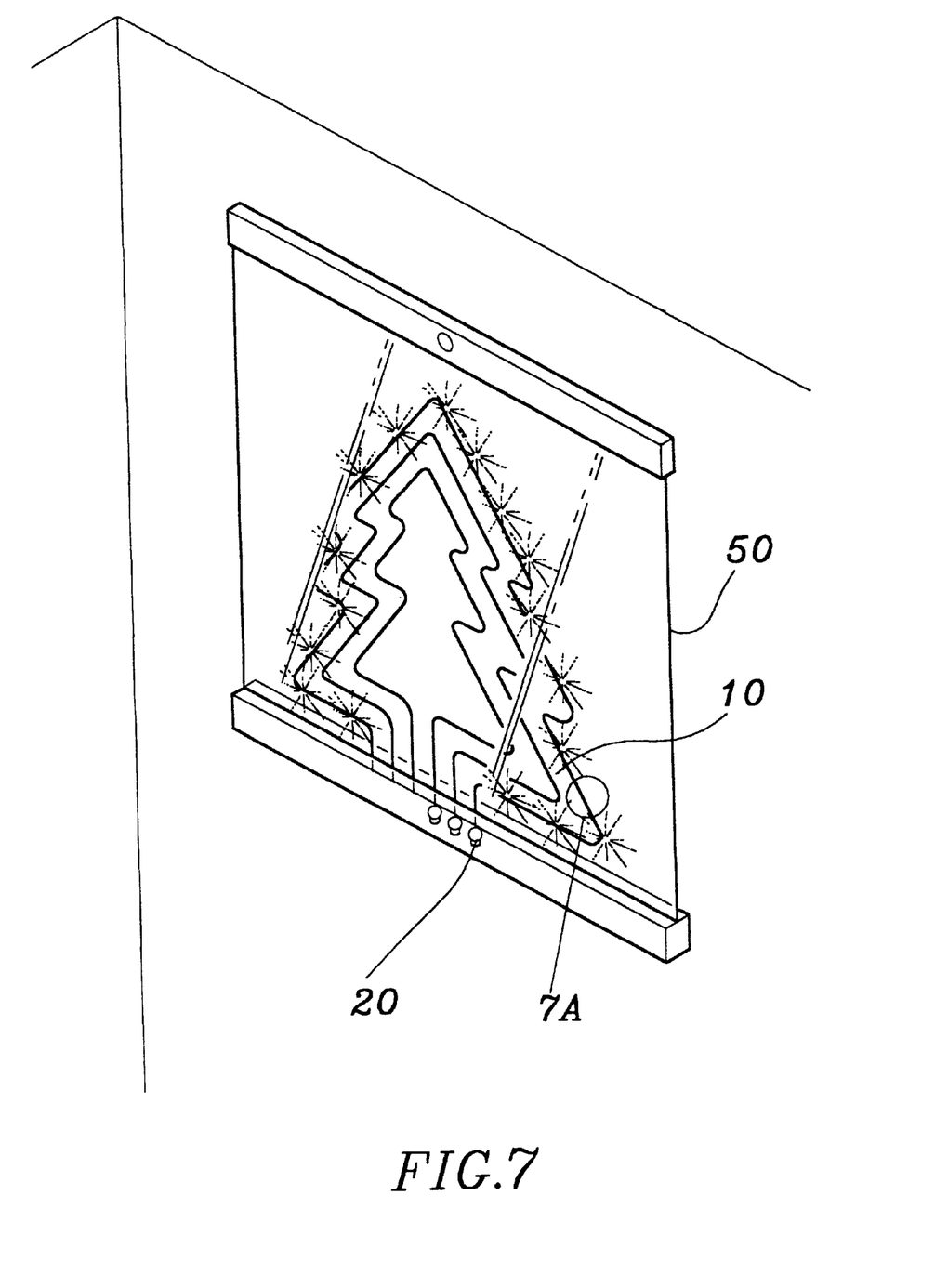
FIG. 7 is a perspective view of still another alternate form of the present invention, showing cord members secured to a flexible sheet material.
Figure 7A:
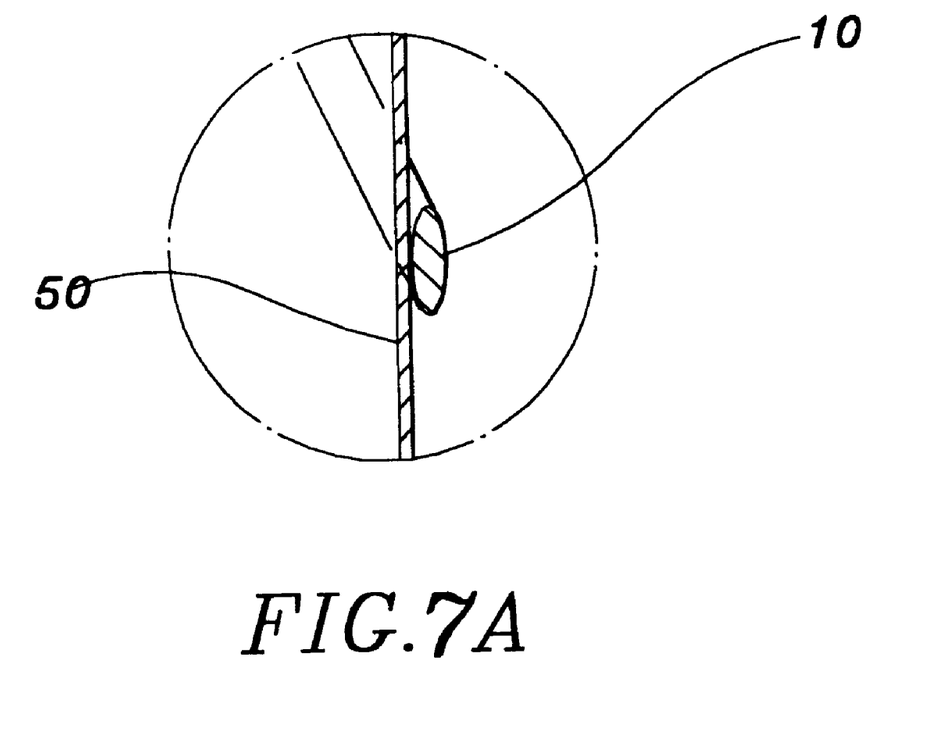
FIG. 7A is an enlarged view of a part of FIG. 7.

Referring to FIGS. 7 and 7A, the cord members 10 may be directly adhered to a flexible sheet material 50, that can be rolled up when not in use.

Figure 8:
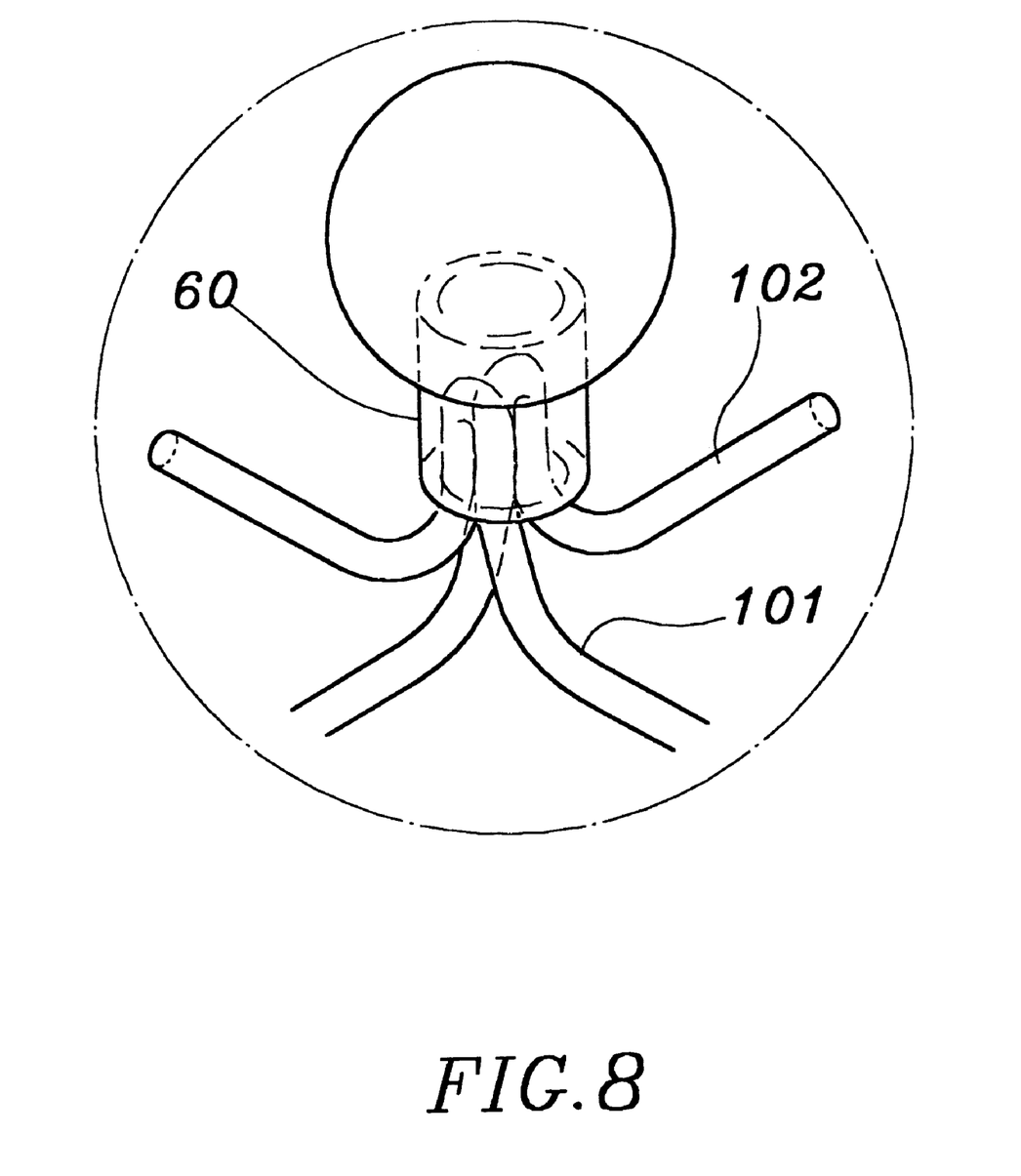
FIG. 8 illustrates still another alternate form of the present invention.

Referring to FIG. 8, two cord members 101,102 may be arranged together, permitting one refracting portion of a first cord member 101 to be respectively retained to a corresponding refracting portion of a second cord member 102 by locating means 60.

It is to be understood that the drawings are designed for purposes of illustration only, and are not intended as a definition of the limits and scope of the invention disclosed.

What the invention claimed is:

1. A light spot generating ornament comprising:
   at least one light penetrable cord member, said at least one light penetrable cord member comprises a plurality of refracting portions disposed at an angle relative to a longitudinal central axis of said light penetrable cord member; and light source means disposed adjacent to said at least one light penetrable cord member at one end and controlled to emit light toward said longitudinal central axis of said at least one light penetrable cord member; wherein said refracting portions are peripheral cuts made at the periphery of said at least one light penetrable cord member at a predetermined depth; and a plurality of transparent shades are mounted on said at least one light penetrable cord member around said peripheral cuts.

2. The light spot generating ornament of claim 1, wherein said transparent shades are respectively fastened to said at least one light penetrable cord member by binding rings.

3. A light spot generating ornament comprising:

at least one light penetrable cord member, said at least one light penetrable cord member comprises a plurality of refracting portions disposed at an angle relative to a longitudinal central axis of said at least one light penetrable cord; and light source means disposed adjacent to said at least one light penetrable cord member at one end and controlled to emit light toward a longitudinal central axis of said at least one light penetrable cord member; wherein said refracting portions are U-turns formed at said at least one light penetrable cord member; and wherein said light spot generating ornament further comprises a plurality of locating means fastened to said at least one light penetrable cord member to secure said U-turns, said locating means are mounted with transparent decorative items.

* * * * *